United States Patent [19]

Nakahashi et al.

[11] Patent Number: 4,788,244

[45] Date of Patent: Nov. 29, 1988

[54] FLAME-RESISTANT POLYAMIDE RESIN COMPOSITION

[75] Inventors: Junnichi Nakahashi; Takuo Shigetomi; Shinichi Kai, all of Nobeoka, Japan

[73] Assignee: Asahi Kasei Kogyo Kabushiki Kaisha, Osaka, Japan

[21] Appl. No.: 149,141

[22] Filed: Jan. 27, 1988

[30] Foreign Application Priority Data

Jan. 27, 1987 [JP] Japan ................................. 62-15182
Oct. 21, 1987 [JP] Japan ................................. 62-264005

[51] Int. Cl.$^4$ ................................................ C08K 5/03
[52] U.S. Cl. ................................... 524/469; 524/411; 524/412; 525/183
[58] Field of Search ................. 524/411, 412, 469; 525/183

[56] References Cited

U.S. PATENT DOCUMENTS

| | | | |
|---|---|---|---|
| 3,966,839 | 6/1976 | Sims | 525/183 |
| 4,100,223 | 7/1978 | Meyer et al. | 525/183 |
| 4,136,135 | 1/1979 | Lee | 524/412 |
| 4,137,212 | 11/1979 | Theysohn et al. | 524/412 |
| 4,373,049 | 2/1983 | Richardson | 524/412 |
| 4,421,892 | 12/1983 | Kasahara et al. | 525/183 |
| 4,427,828 | 1/1984 | Hergenrother et al. | 525/183 |
| 4,429,076 | 1/1984 | Saito et al. | 525/57 |
| 4,628,072 | 12/1986 | Shiraki et al. | 525/57 |
| 4,657,970 | 4/1987 | Shiraki et al. | 525/57 |
| 4,657,971 | 4/1987 | Shiraki et al. | 525/57 |

FOREIGN PATENT DOCUMENTS

| | | | |
|---|---|---|---|
| 51-47034 | 4/1976 | Japan . | |
| 51-47044 | 4/1976 | Japan . | |
| 57-25355 | 2/1982 | Japan | 525/183 |
| 57-53505 | 3/1982 | Japan . | |
| 57-78452 | 5/1982 | Japan | 525/183 |
| 60-86162 | 5/1985 | Japan . | |
| 60-195157 | 10/1985 | Japan . | |
| 61-34058 | 2/1986 | Japan . | |
| 61-51049 | 3/1986 | Japan | 525/183 |

*Primary Examiner*—Veronica P. Hoke
*Attorney, Agent, or Firm*—Birch, Stewart, Kolasch & Birch

[57] ABSTRACT

A flame-resistant composition comprising a blend of (I) polyamide, (II) a brominated polystyrene and (III) a copolymer of an aromatic vinyl compound and an $\alpha$, $\beta$-unsaturated dicarboxylic acid anhydride, wherein the $\alpha$, $\beta$-unsaturated dicarboxylic acid anhydride component of the copolymer is present in an amount of 0.06–0.75 wt % based on the total weight of (I), (II) and (III).

18 Claims, 4 Drawing Sheets

FIG. 5-1
TEST PIECE CONFIGURATION
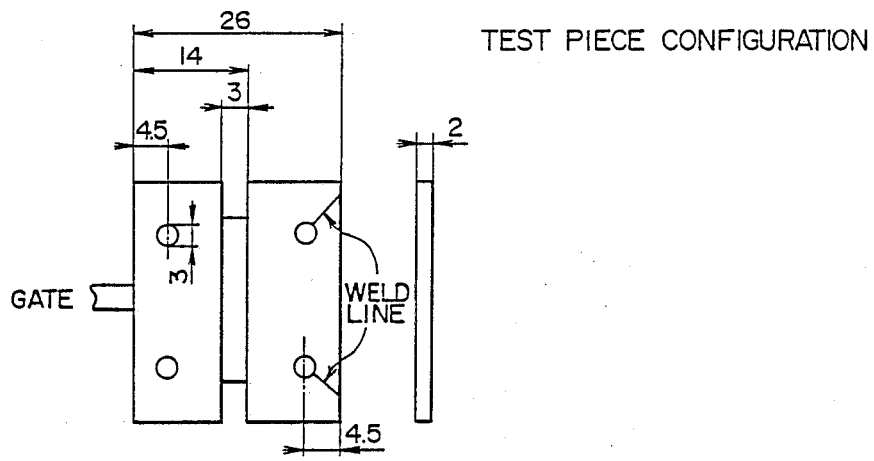
FIG. 5-2
METHOD OF PIN PRESSURE INSERTION
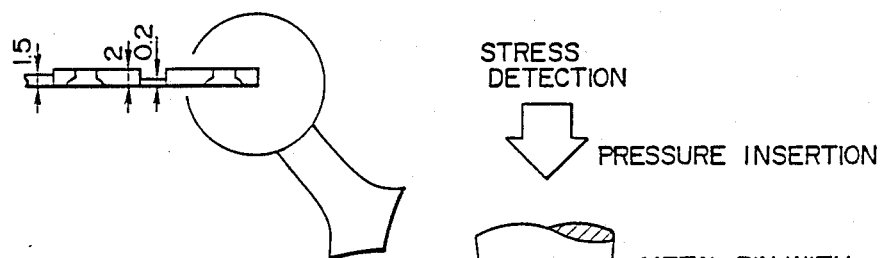
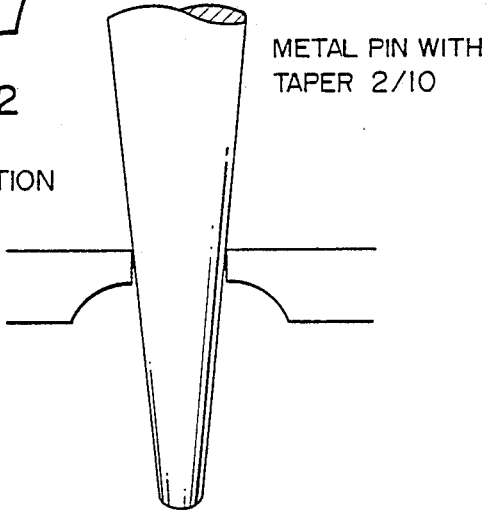
INSERT VELOCITY 50 mm/min

FLAME-RESISTANT POLYAMIDE RESIN COMPOSITION

FIELD OF THE INVENTION

The present invention relates to a flame-resistant polyamide resin composition which is usable for the manufacture of highly flame-resistant parts of electronic and electrical industries.

DISCUSSION OF RELATED ART

In the electronic and electrical industries, from the point of view of fire prevention, a high degree of flame resistance is required. Polyamides, because of their mechanical properties and especially their superior strength and thermal resistance, have been successfully used in these fields. Among the polyamides most widely used has been nylon-6,6.

One of the methods which has been used to make a polyamide flame-resistant is the method of blending a halide flame retardant with the polyamide. Molding temperatures for molding a polyamide are high because the melting point of a polyamide is generally high and thus, the flame retardants used must also have high thermal stability. Conventionally, an addition compounds of 2 molar hexachlorocyclopentadiene with one molar cyclooctadiene has been used, because of its high thermal stability as compared with other halide fire retardants. However, even this high degree of thermal stability was insufficient. Further, there were other problems, such as color change and carbonization during the molding process.

Recently, high molecular weight halide fire retardants have been proposed as agents with improved thermal stability. Among those which are suitable to be used with polyamides are brominated polystyrene [Japanese Patent Laid-Open (Kokai) Nos. 51-47034, 51-47044, and U.S. Pat. No. 4,137,212] and brominated polyphenylene oxide [Japanese Patent Publication (Kokai) Nos. 56-6100 and 60-41093]. The thermal stability of brominated polystyrene is higher than that of brominated polyphenylene oxide, although both have high thermal stability characteristics.

Since parts for electronic and electrical fields, such as connectors, are to be dipped in solder, the manufacture of these parts made from materials having a high melting point would be preferable. Of these materials, nylon-6,6 as well as materials having a melting point which is close to or higher than the melting point of nylon-6,6 have been used most successfully. With melting points at these levels, the thermal stability of brominated polyphenylene oxide is not of a level which is sufficient to successfully avoid color changes or carbonization during the molding process. Thus from this point of view, brominated polystyrene is better suited.

In the case of connectors, etc., the strength of the weld line is an important property. For example, as is shown in FIG. 1, male connector 1 has metal pins 2. Pins 2 are set into holes by pressure insertion using an insertion machine. The holes had been made in advance in resin molded part 3 at the desired positions. In this situation, the size of the molded part holes is smaller than the diameter of the pins, and when the pins are inserted, the holes are pressed and thus become larger. However, because the molded piece around the holes always has a weld line and, if the strength of the weld line is weak, the problem of the weld line cracking arises when the pins are inserted.

In the case of a molded product of polyamide and brominated polystyrene, the cracking problem arising from the insufficient strength of the weld line as described above, was revealed. These cracks occur particularly frequent when the thickness of the molded pieces is thin. As the trend in electric and electronic fields towards making parts lighter, thinner, shorter and smaller becomes increasingly greater, flame-resistant composites having stronger weld lines are needed.

SUMMARY OF THE INVENTION

The present inventors, have conducted intensive investigation to solve this problem. In the course of this investigation, the present inventors have discovered a flame-resistant polyamide resin composition comprising a blend of (I) a polyamide, (II) a brominated polystyrene, and (III) a copolymer comprising an aromatic vinyl compound and an $\alpha,\beta$-unsaturated dicarboxylic acid anhydride; wherein the $\alpha,\beta$-unsaturated dicarboxylic acid anhydride component of the copolymer is present in an amount of 0.06–0.75 wt% based on the total weight of (I), (II) and (III); and also discovered that the molded product of said flame-resistant polyamide resin composition has a high flame resistance, a high thermal stability during the molding process, and weld lines of high strength so that no cracks occur when pins are inserted, and thus the present invention has been accomplished.

BRIEF DESCRIPTION OF THE DRAWINGS

FIGS. 5-1 and 5-2 illustrate the shape of a test piece for the pin pressure insertion test and the manner in which the pin is inserted.

Figure 3:
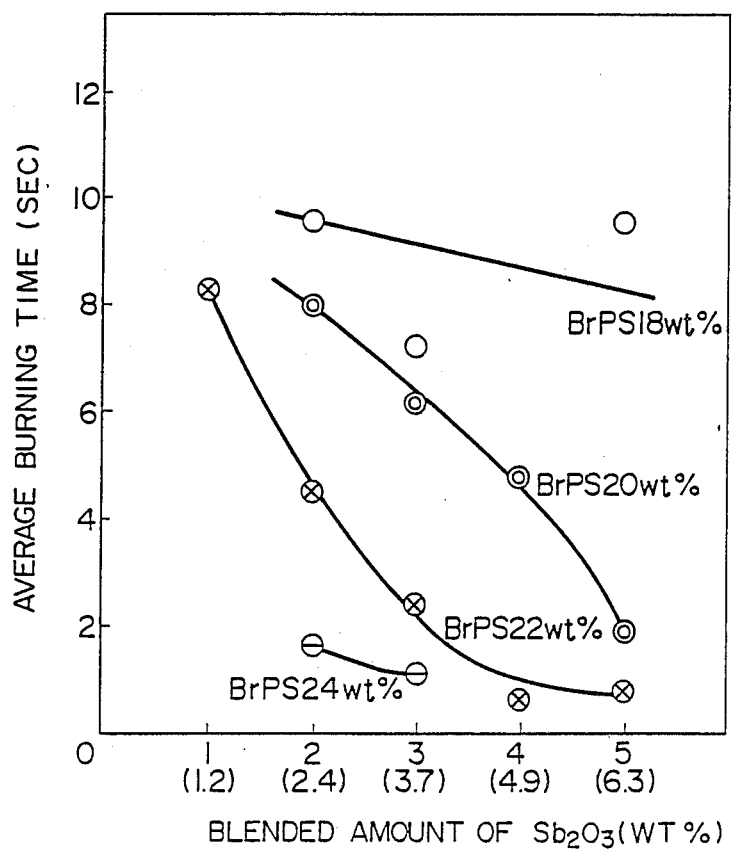
FIG. 3 is a graph showing the relationship between the flame resistance of the resin composition and the amounts of antimony trioxide used in the examples.
Figure 4:
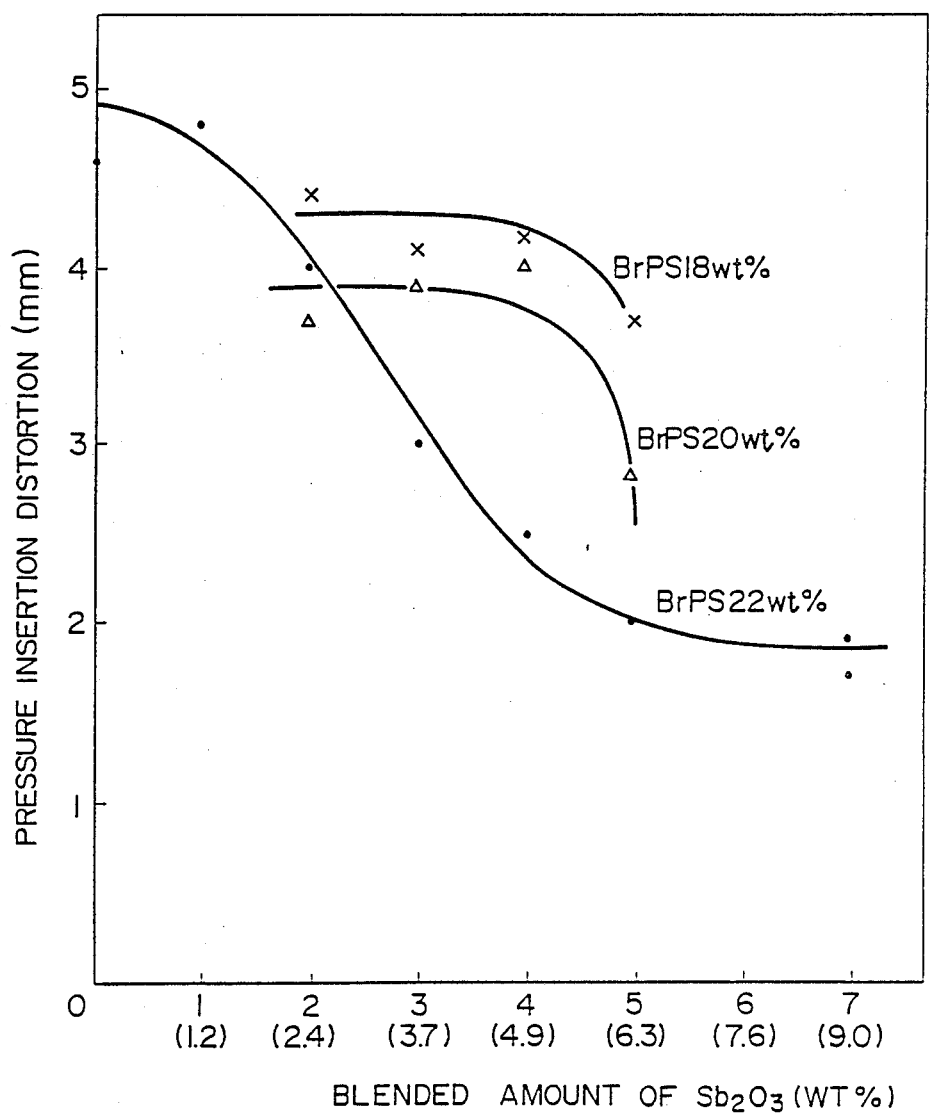
FIG. 4 is a graph showing the relationship between the pin pressure insertion distortion and the amount of antimony trioxide.

In both FIGS. 3 and 4, the figures in parenthesis denote the amount (wt%) of $Sb_2O_3$ blended in the present composition which comprises Nylon-6,6, brominated polystyrene (BrPs) and an $\alpha,\beta$-unsaturated dicarboxylic acid anhydride, in which total weight is regarded as 100 wt%.

DETAILED DESCRIPTION OF THE PREFERRED EMBODIMENTS

The polyamide of the present invention, is a linear polymer having amide bonds, obtained from the polycondensation of an organic diamine and an organic dicarboxylic acid, or obtained from the polycondensation of an aminocaproic acid, or obtained from the ring-opening polymerization of a lactam. Examples of organic diamines include tetramethylene-diamine, hexamethylenediamine and methaxylylenediamine; and examples of organic dicarboxylic acids include adipic acid, sebacic acid, dodecane dicarboxylic acid, terephthalic acid, and isophthalic acid. Examples of aminocaproic acids include epsilon-caproic acid and 11- aminoundecanoic acid, and examples of lactams include epsilon-caprolactan, and omega-laurolactam. Polyamides may be copolymers of the above mentioned or may be mixed polymers thereof. Among these polyamides, nylon-6,6 and polyamides containing nylon-6,6 as the major component are especially preferable from the point of view of solder dip resistance and mechanical properties. Illustrative examples thereof include the copolymer of nylon-6,6 and nylon-6, and the blend of nylon-6,6 and nylon-6.

The preferred amount of the polyamide blended is 50-84 wt%, based on the total amount of the polyamide, the brominated polystyrene, and the copolymer of a aromatic vinyl compound and an α,β-unsaturated dicarboxylic acid anhydride. If the amount blended is below 50 wt%, the good mechanical properties of a polyamide are not obtainable. If the amount blended is over 84 wt%, good flame resistance is not obtainable. The amount most preferable is 60-80 wt%.

The brominated polystyrene of the present invention, can be obtained for example from the bromination of the benzene nucleus of polystyrene. A brominated polystyrene having a high molecular weight is preferable due to its thermal stability. The blended amount of the brominated polystrene should be 14-20 wt% in terms of the bromine amount present based on the total weight as 100 wt% of the polyamide, the brominated polystyrene, and the copolymer of an aromatic vinyl compound and an α,β-unsaturated dicarboxylic acid anhydride. If the bromine amount is less than 14 wt%, a sufficient flame resistance is not manifested, even with an increase in the amount of flame retardant; at 20 wt% there is already sufficient flame resistance, and even if more were blended, this increase would not only be ineffective, but would lead to a deterioration of the physical properties of the weld lines of the molded products. The preferable bromine content in the brominated polystyrene is 55-75 wt%. If the bromine content is below 55 wt%, in order to reach the above-mentioned bromine amount the blend amount of the brominated polystyrene must be increased, which would lead to a deterioration of the physical properties of the weld lines. As for the preferable brominated polystyrene blended amount, it should be more than 15 wt% and less than 35 wt% of the total amount of the polyamide, the brominated polystyrene, and the copolymer of an aromatic vinyl compound and an α,β-unsaturated dicarboxylic acid anhydride.

The aromatic vinyl compound copolymer component of the present invention has, for example, the general chemical formula:

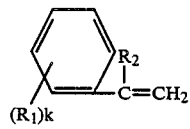

wherein $R_1$ and $R_2$ are each a hydrogen atom or an alkyl group having 1 to 2 carbon atoms; k is an integer of 1 to 5. Specific examples are styrene, α-methylstyrene, p-methylstyrene, etc., with styrene being the most preferable.

The α,β-unsaturated dicarboxylic acid anhydride copolymer component of the present invention is a compound having, for example, the general chemical formula:

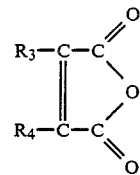

wherein $R_3$ and $R_4$ are each a hydrogen atom or an alkyl group having 1 to 3 carbon atoms. Specific examples are maleic anhydride, methylmaleic anydride, etc., with maleic anhydride being the most preferable.

The percentages of the aromatic vinyl compound component and the α,β-unsaturated dicarboxylic acid anhydride component of the copolymer are: 50-99 wt% of the aromatic vinyl compound component, and 1-50 wt% of the α,β-unsaturated dicarboxylic acid anhydride component based on the weight of the copolymer. The most preferable for the unsaturated dicarboxylic acid anhydride is 7-18%. If the content of the α,β-unsaturated dicarboxylic acid anhydride is too much, the α,β-unsaturated dicarboxylic acid anhydride component could easily cause the deterioration of the nylon; if there is too much of the aromatic vinyl compound component and too little of the α,β-unsaturated dicarboxylic acid anhydride component present, it would become necessary to blend a considerable amount of the copolymer, which would lead to undesirable results from the point of view of the mechanical properties and the flame resistance of the molded products. The blended amount of said copolymer, when the total amount of the polyamide, the brominated polystyrene, and the copolymer of an aromatic vinyl compound and an α,β-unsaturated dicarboxylic acid anhydride is taken as 100 wt%, should be 0.4 to 7 wt%, and the amount of the α,β-unsaturated dicarboxylic acid anhydride copolymer component, in particular, should be 0.06-0.75 wt% based on the total weight of (I), (II) and (III). The reason for this is as follows:

This copolymer seems to cause the brominated polystyrene to become micro-dispersed in the polyamide matrix. This is probably due to the affinity of the aromatic vinyl compound and brominated polystyrene and the affinity or reaction of the α,β-unsaturated dicarboxylic acid anhydride with polyamide. For the aromatic vinyl compound component to have an affinity for the brominated polystyrene and have a binding capability, it would seem that a certain chain length of the aromatic vinyl compound component is necessary. However, this has not been precisely ascertained. On the other hand, affinity and reactivity between α,β-unsaturated dicarboxylic acid anhydride and polyamides are strong. Therefore, a minimum of a single α,β-unsaturated dicarboxylic acid anhydride being contained in the molecule of said copolymer would be enough to be effective, but an excess amount of the α,β-unsaturated dicarboxylic acid anhydride is very detrimental for the polyamide. Thus, the blended amount of said copolymer should be determined in terms of the amount of the α,β-unsaturated dicarboxylic acid anhydride. If the blended amount of the copolymer comprising an aromatic vinyl compound and an α,β-unsaturated dicarboxylic acid anhydride is less than 0.06 wt% in terms of the amount of the α,β-unsaturated dicarboxylic acid anhydride component based on the total weight of (I), (II) and (III), and improvement of the strength of the weld lines would not be sufficient and also the flame resistance would not be deteriorated. More than 0.75 wt% of this copolymer component results in a breakage of strands during the extrusion processing, deterioration of mechanical properties, and color changes. An excessive amount of the α,β-unsaturated dicarboxylic acid anhydride would also deteriorate the flame resistance.

The composition of the present invention may contain metal oxides as auxiliary flame retardants, such as antimony trioxide, antimony pentaoxide, sodium antimonate, zinc oxide, iron oxide, tin oxide, calcium oxide, copper oxide, titanium oxide, and aluminum oxide. Zinc borate is also known as an efficient auxiliary flame retardant. Among these antimony trioxide is the most effective auxiliary flame retardant. The blended amount of these retardants is 0–15 wt% to 100 wt% of the total amount of polyamide, brominated polystyrene and the copolymer of an aromatic vinyl compound and an α,β-unsaturated dicarboxylic acid anhydride. Less than 5 wt% is preferable.

Particularly for high flame resistance, a thickness of 0.8 mm, for example, requires an auxiliary flame retardant in order to meet the V-O standards of the UL regulations in the United States. However, on the other hand, these auxiliary flame retardants severely lower the strength of the weld line and tensile strength as much as or more than brominated polystyrene. Therefore, the amount of the auxiliary flame retardant present should only be the minimum amount necessary.

The composition of the present invention, in response to this situation of demand for this type of high flame resistance, is able to manifest high flame resistance with much smaller amounts of auxiliary flame retardant than the amount required by the conventional molded products, and this greatly contributes to the improvement of the strength of the weld lines. This will be described in detail.

In conventional molded products and/or composition, i.e. systems of polyamide, brominated polystyrene and an auxiliary flame retardant, for example, a system of nylon-6,6, brominated polystyrene and antimony trioxide, in order to obtain a high flame resistance, the amount of brominated polystyrene must be approximately 19 wt% in terms of the bromine amount, and the antimony trioxide must be 8–9 wt%. However, in the system of the composition of the present invention with antimony trioxide added, 18 wt% of the brominated polystyrene in terms of the amount of the bromine and 3 wt% of the antimony trioxide amount are enough. In other words, the necessary amount of brominated polystyrene is approximately the same but the amount of antimony trioxide may be greatly decreased. The reasons are as follows: compared with conventional systems, in the present system, the brominated polystyrene in the polyamide matrix is micro-dispersed, so that flame resistance increases; and the copolymer of an aromatic vinyl compound and an α,β-unsaturated dicarboxylic acid anhydride functions as a drip-preventing agent, so that there would be no danger of the absorbent cotton catching fire from flaming melted resin dripping (as listed in the V-O standards of the UL regulations). Therefore, to obtain the high flame resistance mentioned above, the blended amount of antimony trioxide should be 2.0 to 5 wt% to 100 wt% of the total amount of polyamides, brominated polystyrene and the copolymer of an aromatic vinyl compound and an α,β-unsaturated dicarboxylic acid anhydride.

The composition of the present invention can also contain glass fibers, metallic fibers, inorganic fibers, organic fibers, inorganic fillers, etc. As described above, because the trend towards lighter, thinner, shorter and smaller parts in electronic and electrical fields is becoming increasingly greater, the parts with glass fiber reinforcement are often used. The blended amount of said fiber is 5–100 wt% to 100 wt% of the total of polyamides, brominated polystyrene and the copolymer of an aromatic vinyl compound and an α,β-unsaturated dicarboxylic acid anhydride and, if necessary, an auxiliary flame retardant.

The composition of the present invention can, of course, contain well-known additives for polyamides and additives for styrene resins. Examples of these additives include copper compounds, alkaline metal halides, hindered phenol compounds, and hindered amine compounds as thermal stabilizers; a stearate of metals, a montanate of metals, ethylene bis-stearilamide, methylene stearilamide, an ester of montanic acid, polyethylene glycol, and a mineral oil, etc., as lubricants or mold release agents; colorants (dyes, pigments), plasticizers, ultraviolet light absorbers, antistatic agents, reinforcing agents, etc.

In the manufacturing of the composition of the present invention, it is very important to thoroughly knead each component. If possible, the use of a high-performance kneading type double-axis extruder is preferable. include the ZSK of Wellner Frydiller, Inc., or the PCM of Ikegai Corp., etc. For glass fibers or inorganic fillers, the side-feed method is preferable. Otherwise there may be the undesirable result of their surface treating agent reacting with the α,β-unsaturated dicarboxylic acid anhydride.

The composition of the present invention has a high flame resistance, good thermal stability during the molding process so that there is no change of color, and no change of high strength of the weld lines. Thus, it is extremely useful as a material to be used in the manufacture of parts which are applicable in the electronic and electrical fields.

Below, according to the experimental samples, the effects of the present invention are more specifically illustrated.

EXAMPLES

Materials, preparation of the test pieces and the testing methods used in the examples and control examples:
1. Materials
   (1) Polyamide
      Ny66: nylon-6,6 (number average molecular weight of 17,000)
   (2) Brominated polystyrene
      BrPS: Brominated polystyrene with bromine content of 68 wt%
      (manufactured by Ferro Corp., Pyrocheck 68PB)
   (3) Metal oxide
      $Sb_2O_3$: antimony trioxide
      (manufactured by Nippon Seiko K.K., PATOX-C)
   (4) Glass fibers
      GF: glass fiber
      (manufactured by Asahi Fiber Glass Co., Ltd., MA-416)
   (5) Copolymer of an aromatic vinyl compound and an α,β-unsaturated dicarboxylic acid anhydride
      SMAC-1: styrene and maleic acid anhydride copolymer with 91 wt% of styrene and 9 wt% of maleic acid anhydride (manufactured by Sekisui Plastics Co., Ltd., Dailark 232)

SMAC-2: styrene and maleic acid anhydride copolymer with 85 wt% of styrene and 15 wt% of maleic acid anhydride (manufactured by Sekisui Plastics Co., Ltd., Dailark 332)

(6) Copolymer of styrene and methacrylic acid

SMC: copolymer with 92 wt% of styrene and 8 wt% of methacrylic acid

2. Test piece preparation method

The required amounts of the materials are blended in a tumbler-type blender, then melt-kneaded in an extruder to make strands, and after water cooling, formed into pellets with a cutter. The extruders used are a single-axis extruder with 70 mm diameter screw manufactured by Ishinaka Tekko, Inc., double-axis extruder TEX 44 and 44 mm diameter screws (opposite direction rotation) manufactured by JAPAN STEEL WORKS, LTD., and PCM 45 (same direction rotation) with 45 mm diameter screws manufactured by Ikegai Corp. With the double-axis extruder, the side-feed method is used for the glass fiber.

The pellets obtained in this manner are molded in an injection molding machine (manufactured by JAPAN STEEL WORKS, LTD., as N-70BII) to prepare the test pieces.

3. Testing method (1) Thin plate tensile characteristics of the weld line

Figure 2:
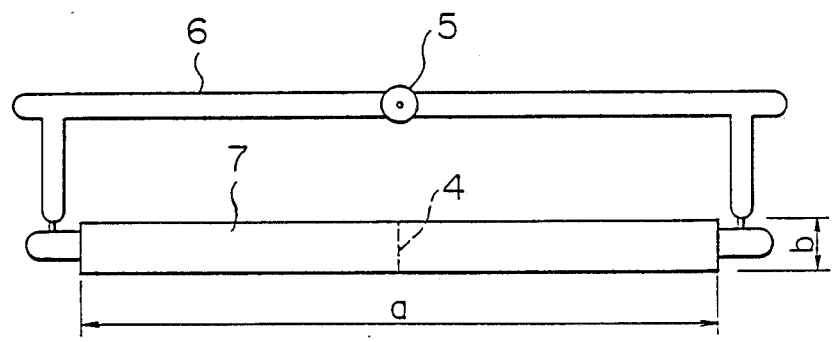
FIG. 2 outlines a die for making the molded pieces used in examining the physical properties of the weld lines of the molded pieces used in the examples.

As shown in FIG. 2, a die with length 127 mm (in the figure; (a), width 12.7 mm (in the figure: (b) and thickness 0.8 mm, and shaped such that molten resin flowing in from both ends to form the weld line 4 in the center, is used to create the molded pieces. These molded pieces are tested according to the tensile test method ASTM-D-638, and thus tensile strength and tensile elongation are measured. Also, in said figure, 5 is the sprue, 6 is the runner, and 7 is the test piece.

(2) Pin pressure insertion test of the weld line

Figure 1:
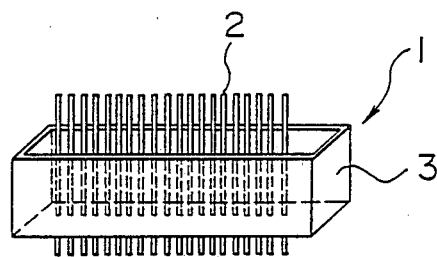
FIG. 1 outlines a connector as an application example of the present flame-resistant polyamide resin composition.

A 2/10 tapered metal pin is inserted into the pin hole where the weld lines appear in the test piece as shown in FIG. 5-1, using the method shown in FIG. 5-2. The pressure insertion velocity is 50 mm/min. The stress on the pin and the insertion distance at this time are measured and recorded. Finally the weld line is destroyed, stream became zero, and this is made as the end of the test. The pin pressure insertion strength is defined as the maximum stress during this time, and the migration distance of the pin, from the time the stress is first applied to the time stress became zero when the weld lines are destroyed, is estimated as the pin pressure insertion distortion.

(3) Tensile properties of normal parts

Measurement is performed in accordance with ASTM-D-638.

(4) Flammability

Following the V-O estimating methods of the UL-94 regulations, ten test pieces are each put in contact with a flame twice, for a total of 20 times, and the average and maximum burning times are recorded, as well as the number of test pieces which dripped and caught absorbant cotton on fire.

EXAMPLE 1-5 AND CONTROL EXAMPLE 1

Blended compositions and evaluation results are shown in Table 1. As is clear from Example 1 and Control Example 1, when the copolymer of an aromatic vinyl compound and an $\alpha,\beta$-unsaturated dicarboxylic acid anhydride is added, the properties of the weld lines are improved.

Each of the examples achieves the aim of the present invention but if they are examined in detail, Example 2 and Example 1 indicate that double-axis extruders yield excellent physical properties of the weld line than single-axis extruders, and this shows that plenty of kneading is preferable. Example 2 and Example 3 indicate that reduction of the metal oxides contributes to the improvement of the physical properties of weld line. In other words, the present invention enables a reduction of metal oxide. Examples 4, 5 and 3 indicate that even among double-axis extruders, the same direction rotation types give a more preferable effect on the improvement in flammability and physical properties of weld lines than opposite direction rotation types.

TABLE 1

| | Item | | | | | | | |
|---|---|---|---|---|---|---|---|---|
| | Composition | | | | | Extruder | Weld line Thin plate tensile test | |
| Unit | Ny66 | GF | BrPS | Sb$_2$O$_3$ | SMAC-2 | | Strength Kg/cm$^2$ | Elongation % |
| | | | wt % | | | | | |
| Control Example 1 | 56 | 15 | 22 (19.2) | 7 (9.0) | — | Single-axis | 477 | 3.5 |
| Example 1 | 53 | 15 | 22 (19.2) | 7 (9.0) | 3 (0.58) | Single-axis | 629 | 4.1 |
| Example 2 | 53 | 15 | 22 (19.2) | 7 (9.0) | 3 (0.58) | Double-axis TEX | 725 | 4.4 |
| Example 3 | 57 | 15 | 22 (18.3) | 3 (3.7) | 3 (0.55) | Double-axis TEX | 780 | 4.8 |
| Example 4 | 57 | 15 | 22 (18.3) | 3 (3.7) | 3 (0.55) | Double-axis PCM | 758 | 6.0 |
| Example 5 | 58 | 15 | 22 (18.3) | 2 (2.4) | 3 (0.54) | Double-axis PCM | 773 | 5.8 |

| | Weld line Pin pressure insertion | | Normal part | | Flammability | | |
|---|---|---|---|---|---|---|---|
| | | | Tensile | Tensile | Burning time | | Number of pieces of absorbent cotton |
| Unit | Strength kg · f | Distortion mm | strength kg/cm$^2$ | elongation % | Maximum Seconds | Average Seconds | which caught fire Pieces |
| Control Example 1 | — | — | 1272 | 7.2 | 7 | 4.1 | 1 |
| Example 1 | 28.2 | 1.7 | 1324 | 7.0 | 3 | 1.4 | 0 |
| Example 2 | 28.5 | 1.9 | 1280 | 6.9 | 4 | 2.0 | 0 |
| Example 3 | 35.2 | 2.6 | 1290 | 7.0 | 14 | 6.2 | 0 |

TABLE 1-continued

| | | | Item | | | | |
|---|---|---|---|---|---|---|---|
| Example 4 | 37.6 | 2.9 | 1280 | 6.9 | 9 | 2.3 | 0 |
| Example 5 | 42.3 | 4.3 | 1302 | 7.2 | 12 | 5.6 | 2 |

The values of BrPS in parentheses show amounts of blended BrPS in terms of the bromine amount of the total weight as 100 wt % of Ny66, BrPS and SMAC-2. The values of SMAC-2 in parentheses show amounts of blended SMAC-2 as maleic acid anhydride of the total weight as 100 wt % of Ny66, BrPS, and SMAC-2. The values of $Sb_2O_3$ in parentheses are the amounts of blended $Sb_2O_3$ to the total weight as 100 wt % of Ny66, BrPS, and SMAC-2.

EXAMPLES 6-10 AND CONTROL EXAMPLES 2-4

Blended composition and evaluation results are shown in Table 2.

In the case of Control Example 2, in which the copolymer of an aromatic vinyl compound and an α,β-unsaturated diacarboxylic acid anhydride is not blended, the physical properties of the weld lines are not sufficient, even though some improvement is achieved by lowering the blended amount of metal oxide and by kneading thoroughly with the double-axis extruder. Also, whitening and delamination of the thin plate molded piece are observed. In addition, catching the absorbent cotton on fire is observed in the flammability test.

In contrast, in Examples 6-10, in which the copolymer of an aromatic vinyl compound and an α,β-unsaturated dicarboxylic acid anhydride is present in an amount of 0.06-0.75 wt% in terms of the amount of the α,β-unsaturated dicarboxylic acid anhydride component based on the total weight as 100 wt% of the polyamide, the brominated polystyrene and the copolymer of an aromatic vinyl compound and an α,β-unsaturated dicarboxylic acid anhydride, the pieces have good physical properties of weld lines, an improvement in flammability and extrusion stability, and exhibit excellent overall performance.

When a large amount of the copolymer of an aromatic vinyl compound and an α,β-unsaturated dicarboxylic acid anhydride is blended, such as in Control Examples 3 and 4, the extrusion stability became extremely poor, and both the physical properties of the weld lines and the tensile property deteriorated strikingly.

TABLE 2

| | | | | | | | | Weld line | |
|---|---|---|---|---|---|---|---|---|---|
| | | | | | | | Surface | Thin plate tensile test | |
| | | | Composition | | | Extrusion | whitening of | Strength | Elongation |
| | Unit | Ny66 | GF | BrPS | $Sb_2O_3$ | SMAC-2 | property | molded pieces | $kg/cm^2$ | % |
| | | | | wt % | | | | | | |
| Control Example 2 | | 60 | 15 | 22 (18.3) | 3 (3.7) | 0 (0) | Good | Present | 677 | 5.2 |
| Example 6 | | 59.6 | 15 | 22 (18.3) | 3 (3.7) | 0.4 (0.06) | Good | Not present | 710 | 5.4 |
| Example 7 | | 59 | 15 | 22 (18.3) | 3 (3.7) | 1 (0.18) | Good | Not present | 729 | 5.5 |
| Example 8 | | 58 | 15 | 22 (18.3) | 3 (3.7) | 2 (0.37) | Good | Not present | 775 | 6.2 |
| Example 9 | | 57 | 15 | 22 (18.3) | 3 (3.7) | 3 (0.55) | Poor | Not present | 731 | 5.5 |
| Example 10 | | 55 | 15 | 22 (18.3) | 3 (3.7) | 5 (0.75) | Poor | Not present | 730 | 5.3 |
| Control Example 3 | | 53 | 15 | 22 (18.3) | 3 (3.7) | 7 (1.05) | Poor | Not present | 560 | 4.5 |
| Control Example 4 | | 47 | 15 | 22 (18.3) | 3 (3.7) | 13 (2.38) | Very poor | Not present | 325 | 2.6 |

| | Weld line | | Normal part | | Flammability | | |
|---|---|---|---|---|---|---|---|
| | Pin pressure insertion | | Tensile | Tensile | Burning time | | Number of pieces of absorbent cotton |
| Unit | Strength Kg·f | Distortion mm | strength $kg/cm^2$ | elongation % | Maximum Seconds | Average Seconds | which caught fire Pieces |
| Control Example 2 | 27.9 | 1.6 | 1402 | 7.2 | 7 | 3.2 | 6 |
| Example 6 | 37.5 | 2.7 | 1390 | 7.1 | 15 | 8.3 | 1 |
| Example 7 | 37.7 | 3.0 | 1385 | 7.0 | 11 | 5.6 | 0 |
| Example 8 | 36.6 | 3.2 | 1228 | 6.1 | 8 | 2.7 | 0 |
| Example 9 | 37.5 | 2.7 | 1228 | 6.2 | 5 | 1.9 | 0 |
| Example 10 | 32.4 | 2.4 | 1210 | 6.0 | 6 | 2.4 | 0 |
| Control Example 3 | 29.8 | 1.9 | 1050 | 5.0 | — | — | — |
| Control Example 4 | 12.4 | 0.7 | 466 | 3.1 | — | — | — |

The values of BrPS, $Sb_2O_3$ and SMAC-2 in parentheses are as defined in Table 1.
Extrusion property:
Good: Strands come out smoothly, and continuous operation is possible.
Poor: Strand breakage occurs occasionally.
Very poor: Strand breakage occurs frequently. Color change to reddish brown is observed.
Surface whitening of molded pieces: Observed the surfaces of the test pieces used for measurement of the physical properties of weld lines.
Extruder: PCM45 is used.

EXAMPLES 11-13

Blended compositions and evaluation results are shown in Table 3.

Examples 11-13 indicate that the use of the copolymer of an aromatic vinyl compound and an α,β-unsaturated dicarboxylic acid anhydride, which has a different copolymerization ratio from the Experimental Samples 6-10, gives similarly good results. This indicates that molded products prepared from compositions blended with a similar amount of α,β-unsaturated dicarboxylic acid anhydride, have similar physical properties.

distortion and blended amount of $Sb_2O_3$ is shown in FIG. 4. Weld pin pressure insertion distortion decreases with an increase of the blended amount of $Sb_2O_3$. Weld pin pressure insertion distortion increases relatively with a decrease of the blended amount of BrPS It decreases even under said conditions if 5 wt% of $Sb_2O_3$ is further added thereto.

Examples 14-31 and Control Examples 5 and 6 indicate that compositions prepared by blending brominated polystyrene so as to bring the amount of brominated polystyrene to 14 to 20 wt% in terms of the amount of bromine based on the total amount as 100 wt% of the polyamide, the brominated polystyrene and

TABLE 3

| | Composition | | | | | Extruder | Weld line Thin plate tensile test | |
|---|---|---|---|---|---|---|---|---|
| Unit | Ny66 | GF | BrPS wt % | $Sb_2O_3$ | SMAC-1 | — | Strength $kg/cm^2$ | Elongation % |
| Example 11 | 58.3 | 15 | 22 (18.3) | 3 (3.7) | 1.7 (0.19) | Double-axis PCM | 730 | 5.5 |
| Example 12 | 56.7 | 15 | 22 (18.3) | 3 (3.7) | 3.3 (0.36) | " | 750 | 6.1 |
| Example 13 | 55.0 | 15 | 22 (18.3) | 3 (3.7) | 5.0 (0.55) | " | 710 | 5.3 |

| | Weld line Pin pressure insertion | | Normal part | | Flammability Burning time | | Number of pieces of absorbent cotton |
|---|---|---|---|---|---|---|---|
| Unit | Strength kg · f | Distortion mm | Tensile strength $kg/cm^2$ | Tensile elongation % | Maximum Seconds | Average Seconds | which caught fire Pieces |
| Example 11 | 36.5 | 3.1 | 1250 | 6.3 | 11 | 5.7 | 0 |
| Example 12 | 36.7 | 3.7 | 1230 | 6.1 | 9 | 3.3 | 0 |
| Example 13 | 31.5 | 2.4 | 1190 | 5.9 | 12 | 5.2 | 0 |

The values of BrPS, $Sb_2O_3$ and SMAC-2 in parentheses are as defined in Table 1.

EXAMPLES 14-31 AND CONTROL EXAMPLES 5 AND 6

Blended compositions and evaluation results are shown in Table 4. Also, a graph which has the blended amount of $Sb_2O_3$ as the horizontal axis and the average burning time as the vertical axis, with the amount of brominated polystyrene as a parameter, is shown in FIG. 3. The relationship between pressure insertion the copolymer of an aromatic vinyl compound and an α,β-unsaturated dicarboxylic acid anhydride, show good flame resistance. Also indicated therein is that compositions without the brominated polystyrene, have a low flame resistance level, and that with an excessive increase of the brominated polystyrene and/or the metal oxide tend to have weld lines of lowered strength.

TABLE 4

| | Composition | | | | | Extruder | Weld line Thin plate tensile test | |
|---|---|---|---|---|---|---|---|---|
| Unit | Ny66 | GF | BrPS wt % | $Sb_2O_3$ | SMAC-2 | — | Strength $Kg/cm^2$ | Elongation % |
| Example 14 | 55 | 15 | 24 (19.9) | 3 (3.7) | 3 (0.55) | Double-axis PCM | 709 | 5.5 |
| Example 15 | 56 | 15 | 24 (19.6) | 2 (2.4) | 3 (0.54) | " | 751 | 6.1 |
| Example 16 | 56 | 15 | 23 (19.1) | 3 (3.7) | 3 (0.55) | " | 736 | 5.6 |
| Example 17 | 57 | 15 | 23 (18.8) | 2 (2.4) | 3 (0.54) | " | 738 | 5.7 |
| Example 18 | 55 | 15 | 22 (18.7) | 5 (6.3) | 3 (0.56) | " | 710 | 5.5 |
| Example 19 | 56 | 15 | 22 (18.5) | 4 (4.9) | 3 (0.56) | " | 634 | 5.2 |
| Example 20 | 57 | 15 | 22 (18.2) | 3 (3.7) | 3 (0.55) | " | 727 | 5.3 |
| Example 21 | 58 | 15 | 22 (18.0) | 2 (2.4) | 3 (0.54) | " | 736 | 5.7 |
| Example 22 | 59 | 15 | 22 (17.8) | 1 (1.2) | 3 (0.54) | " | 755 | 5.7 |
| Example 23 | 60 | 15 | 22 (17.6) | 0 | 3 (0.53) | " | 779 | 5.7 |
| Example 24 | 57 | 15 | 20 (17.0) | 5 (6.3) | 3 (0.56) | " | 733 | 5.5 |

TABLE 4-continued

| | | | | Item | | | | |
|---|---|---|---|---|---|---|---|---|
| Example 25 | 58 | 15 | 20 (16.8) | 4 (4.9) | 3 (0.56) | " | 721 | 6.1 |
| Example 26 | 59 | 15 | 20 (16.6) | 3 (3.7) | 3 (0.55) | " | 755 | 5.6 |
| Example 27 | 60 | 15 | 20 (16.4) | 2 (2.4) | 3 (0.54) | " | 755 | 5.6 |
| Example 28 | 59 | 15 | 18 (15.3) | 5 (6.3) | 3 (0.56) | " | 797 | 5.6 |
| Example 29 | 60 | 15 | 18 (15.1) | 4 (4.9) | 3 (0.56) | " | 796 | 5.6 |
| Example 30 | 61 | 15 | 18 (14.9) | 3 (3.7) | 3 (0.55) | " | 794 | 5.5 |
| Example 31 | 62 | 15 | 18 (14.7) | 2 (2.4) | 3 (0.54) | " | 824 | 5.8 |
| Control Example 5 | 80 | 15 | 0 (0) | 2 (2.4) | 3 (0.53) | " | 860 | 7.5 |
| Control Example 6 | 58 | 15 | 22 (18.7) | 5 (6.3) | 0 (0) | " | 559 | 4.5 |

| | Weld line | | Normal part | | Flammability | | |
|---|---|---|---|---|---|---|---|
| | Pin pressure insertion | | Tensile | Tensile | Burning time | | Number of pieces of absorbent cotton |
| Unit | Strength kg · f | Distortion mm | strength Kg/cm$^2$ | elongation % | Maximum Seconds | Average Seconds | which caught fire Pieces |
| Example 14 | 33.7 | 2.2 | 1168 | 6.7 | 3 | 1.2 | 0 |
| Example 15 | 37.2 | 2.7 | 1174 | 6.6 | 3 | 1.6 | 0 |
| Example 16 | 37.8 | 3.0 | 1187 | 6.7 | 3 | 1.4 | 0 |
| Example 17 | 38.2 | 2.8 | 1256 | 7.0 | 10 | 3.4 | 0 |
| Example 18 | 35.7 | 2.0 | | | 2 | 0.7 | 0 |
| Example 19 | 39.7 | 2.5 | | | 3 | 0.6 | 0 |
| Example 20 | 37.6 | 3.0 | 1280 | 6.9 | 9 | 2.3 | 0 |
| Example 21 | 42.9 | 4.0 | 1315 | 7.1 | 12 | 4.4 | 0 |
| Example 22 | 45.5 | 4.8 | 1311 | 7.1 | 15 | 8.2 | 0 |
| Example 23 | 43.7 | 4.6 | 1324 | 7.0 | 13 | 7.0 | 8 |
| Example 24 | 38.8 | 2.8 | | | 6 | 1.8 | 0 |
| Example 25 | 41.6 | 4.0 | | | 16 | 4.7 | 0 |
| Example 26 | 43.0 | 3.9 | | | 19 | 6.1 | 2 |
| Example 27 | 41.7 | 3.7 | | | 17 | 7.9 | 1 |
| Example 28 | 41.3 | 3.7 | | | 27 | 9.5 | 0 |
| Example 29 | 44.5 | 4.2 | | | 23 | 8.3 | 1 |
| Example 30 | 44.0 | 4.1 | | | 20 | 7.2 | 1 |
| Example 31 | 45.0 | 4.4 | | | 19 | 9.5 | 0 |
| Control Example 5 | — | — | | | >30 | >30 | 10 |
| Control Example 6 | 32.9 | 2.0 | | | 3 | 0.8 | 0 |

The values of BrPS, Sb$_2$O$_3$ and SMAC-2 in parentheses are as defined in Table 1.
Whitening is observed on the surface of the molded piece of Control Example 6.

CONTROL EXAMPLES 7 AND 8

The copolymer of styrene and methacrylic acid is used instead of the copolymer of an aromatic vinyl compound and an α,β-unsaturated dicarboxylic acid anhydride. The results are shown in Table 5. Improvement in the physical properties of the weld lines is not observed when methacrylic acid is used as a copolymerization component.

EXAMPLES 32 AND 33 AND CONTROL EXAMPLE 9

Examples of respective systems containing no glass fiber are shown in Table 6. Improvement in the physical properties of weld lines and flammability with the addition of SMAC is observed in these systems as well.

TABLE 5

| | | | | | Item | | | | | | |
|---|---|---|---|---|---|---|---|---|---|---|---|
| | Composition | | | | | | | Weld line | | | |
| | | | | | | | | Thin plate tensile test | | Pin pressure insertion | |
| Unit | Ny66 | GF | BrPS wt % | Sb$_2$O$_3$ | Additive | Amount wt % | Extruder | Strength kg/cm$^2$ | Elongation % | Strength kg f | Elongation mm |
| Control Example 7 | 58 | 15 | 22 | 3 (3.7) | SMC | 2 (0.20) | Double-axis PCM | 560 | 4.7 | 27.5 | 1.7 |
| Control Example 8 | 56 | 15 | 22 | 3 (3.7) | " | 4 (0.39) | Double-axis PCM | 563 | 4.8 | 27.6 | 1.6 |

TABLE 6

| Item |
|---|
| Weld line |

TABLE 6-continued

| | Item | | | | | | | |
|---|---|---|---|---|---|---|---|---|
| | Composition | | | | | | Tensile | Tensile |
| | Ny66 | GF | BrPS | Sb$_2$O$_3$ | SMAC-1 | | strength | elongation |
| Unit | | | wt % | | | Extruder | kg/cm$^2$ | % |
| Example 32 | 78 | 0 | 20 (13.6) | 0 | 2.0 (0.30) | Double-axis PCM | 646 | 7.2 |
| Example 33 | 75 | 0 | 20 (14.0) | 3 (3) | 2.0 (0.31) | " | 624 | 6.8 |
| Control Example 9 | 77 | 0 | 20 (14.0) | 3 (3) | 0 | " | 340 | 2.9 |

| | Normal part | | Flammability | | |
|---|---|---|---|---|---|
| | Tensile | Tensile | Burning time | | Number of pieces of absorbent |
| | strength | elongation | Maximum | Average | cotton which caught fire |
| Unit | kg/cm$^2$ | % | Seconds | Seconds | Pieces |
| Example 32 | 890 | 7.7 | 13 | 4.4 | 5 |
| Example 33 | 877 | 8.0 | 15 | 7.0 | 1 |
| Control Example 9 | 870 | 7.9 | 15 | 4.5 | 10 |

What is claimed is:

1. A flame-resistant polyamide resin composition comprising a blend of
   (I) a polyamide,
   (II) a brominated polystyrene, and
   (III) a copolymer comprising an aromatic vinyl compound and an $\alpha,\beta$-unsaturated dicarboxylic acid anhydride; wherein the $\alpha,\beta$-unsaturated dicarboxylic acid anhydride component of the copolymer is present in an amount of 0.06-0.75 wt% based on the total weight of (I), (II), and (III).

2. The flame-resistant polyamide resin composition of claim 1, wherein said brominated polystyrene is blended in the amount of 14-20 wt% in terms of the amount of bromine present based on the total weight of (I), (II) and (III).

3. The flame-resistant polyamide resin composition of claims 1 or 2, which comprises 0-15 wt% of a metal oxide based on the total weight of (I), (II) and (III).

4. The flame-resistant polyamide resin composition of claim 1, wherein the polyamide is nylon-6,6, a copolymer of nylon-6,6 or a blend of nylon-6,6 and nylon-6.

5. The flame-resistant polyamide resin composition of claim 1, wherein the polyamide is a copolymer of nylon-6,6 and nylon-6.

6. The flame-resistant polyamide resin composition of claim 1, wherein the aromatic vinyl compound component of the copolymer is represented by the formula:

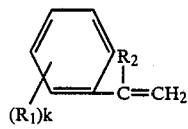

wherein R$_1$ and R$_2$ are each a hydrogen atom or an alkyl group having 1 to 3 carbon atoms, k is an integer of 1 to 5.

7. The flame-resistant polyamide resin composition of claim 1, wherein the aromatic vinyl compound component of the copolymer is styrene, $\alpha$-methylstyrene or p-methylstyrene.

8. The flame-resistant polyamide resin composition of claim 1, wherein the $\alpha,\beta$-unsaturated dicarboxylic acid anhydride component of the copolymer is represented by the formula:

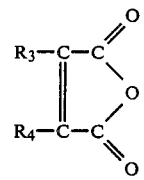

wherein R$_3$ and R$_4$ are each a hydrogen atom or an alkyl group having 1 to 3 carbon atoms.

9. The flame-resistant polyamide resin composition of claim 1, wherein the $\alpha,\beta$-unsaturated dicarboxylic acid anhydride component of the copolymer is maleic anhydride or methylmaleic anhydride.

10. The flame-resistant polyamide resin composition of claim 1, which comprises 50-84 wt% of (I).

11. The flame-resistant polyamide resin composition of claim 1, which comprises 60-80 wt% of (I), 15-35 wt% of (II) and 0.4-7 wt% (III).

12. The flame-resistant polyamide resin composition of claim 1, wherein the bromine content in the brominated polystyrene is 55-75 wt%.

13. The flame-resistant polyamide resin composition of claim 1, wherein the copolymer comprises 50-99 wt% of the aromatic vinyl compound and 1-50 wt% of the $\alpha,\beta$-unsaturated dicarboxylic acid anhydride.

14. The flame-resistant polyamide resin composition of claim 13, wherein the copolymer comprises 7-18 wt% of the $\alpha,\beta$-unsaturated dicarboxylic acid anhydride.

15. The flame-resistant polyamide resin composition of claim 3, wherein the metal oxide is antimony trioxide, antimony pentaoxide, sodium antimonate, zinc oxide, iron oxide, tin oxide, calcium oxide, copper oxide, titanium oxide or aluminum oxide.

16. The flame-resistant polyamide resin composition of claim 3, in which the amount of metal oxide present is less than 5 wt% based on the total weight of (I), (II) and (III).

17. The flame-resistant polyamide resin composition of claim 1, which comprises 3 wt% of antimony trioxide and wherein the said brominated polystyrene is blended in the amount of 18 wt% in terms of the amount of bromine present.

18. The flame-resistant polyamide resin composition of claim 1, wherein the brominated polystyrene is micro-dispersed in the polyamide matrix.

* * * * *